US010578333B2

(12) United States Patent
Yoskowitz

(10) Patent No.: US 10,578,333 B2
(45) Date of Patent: Mar. 3, 2020

(54) CORNER SEAL DEVICE FOR DUCTWORK FOR CONDITIONED AIR AND METHOD OF ASSEMBLY OF SUCH DUCTWORK TO PREVENT AIR LEAKS

(71) Applicant: Capital Hardware Supply, Inc., Closter, NJ (US)

(72) Inventor: David Yoskowitz, Bloomsbury, NJ (US)

(73) Assignee: Capital Hardware Supply, Inc., Closter, NJ (US)

( * ) Notice: Subject to any disclaimer, the term of this patent is extended or adjusted under 35 U.S.C. 154(b) by 427 days.

(21) Appl. No.: 15/102,667

(22) PCT Filed: Dec. 11, 2014

(86) PCT No.: PCT/US2014/069841
§ 371 (c)(1),
(2) Date: Jun. 8, 2016

(87) PCT Pub. No.: WO2015/089329
PCT Pub. Date: Jun. 18, 2015

(65) Prior Publication Data
US 2016/0327305 A1 Nov. 10, 2016

Related U.S. Application Data

(60) Provisional application No. 61/915,348, filed on Dec. 12, 2013.

(51) Int. Cl.
*F24F 13/02* (2006.01)
*F16L 23/16* (2006.01)
(Continued)

(52) U.S. Cl.
CPC ......... *F24F 13/0209* (2013.01); *F16J 15/104* (2013.01); *F16L 23/14* (2013.01); *F16L 23/16* (2013.01); *F24F 13/0245* (2013.01)

(58) Field of Classification Search
CPC ....... F16L 23/14; F16L 23/16; F24F 12/0209; F24F 12/0245; F16J 15/104
(Continued)

(56) References Cited

U.S. PATENT DOCUMENTS 4,040,449 A * 8/1977 Butler ........................ 285/424 X
4,215,518 A 8/1980 Blair
(Continued)

FOREIGN PATENT DOCUMENTS

DE 8218968 10/1982
DE 202007018698 3/2009
(Continued)

OTHER PUBLICATIONS

International Search Report for corresponding PCT Application No. PCT/US2014/069841 dated Mar. 19, 2015.
(Continued)

*Primary Examiner* — Zachary T Dragicevich
(74) *Attorney, Agent, or Firm* — Abelman, Frayne & Schwab

(57) ABSTRACT

A corner seal device for sealing a space defined between respective end portions of an adjacent pair of orthogonal flange members of a conditioned air duct having a generally rectangular cross-section includes a first plate member having a surface dimensioned and configured for placement in face-to-face relation with the respective adjacent upper surface portions of said adjacent flange members; and a leg member extending away from a generally central portion of said plate member and being generally perpendicular thereto, wherein the leg member includes second and third orthogonal plate members having respectively orthogonal surface portions, and wherein the second and third orthogonal plate members are configured and dimensioned to engage corresponding respective adjacent orthogonal inner
(Continued)

wall surface portions of the duct when the first plate member is positioned on said flange members.

20 Claims, 10 Drawing Sheets

(51) Int. Cl.
*F16L 23/14* (2006.01)
*F16J 15/10* (2006.01)

(58) Field of Classification Search
USPC ......... 285/424, 910, 917; 277/609, 616, 626
See application file for complete search history.

(56) References Cited

U.S. PATENT DOCUMENTS

| | | | |
|---|---|---|---|
| 4,447,079 A | 5/1984 | Sullivan | |
| 4,466,641 A | 8/1984 | Heilman et al. | |
| 4,507,836 A | 4/1985 | Hiromitsu | |
| 4,542,923 A | 9/1985 | La Crosse et al. | |
| 4,566,724 A * | 1/1986 | Arnoldt ............... | F16L 23/14 |
| | | | 285/424 X |
| 4,870,749 A | 10/1989 | Roy et al. | |
| 5,005,879 A | 4/1991 | Jackson | |
| 5,022,688 A | 6/1991 | Arnoldt | |
| 5,069,484 A | 12/1991 | McElroy | |
| 5,090,101 A | 2/1992 | Welty | |
| 5,105,640 A | 4/1992 | Moore | |
| 5,165,730 A | 11/1992 | McElroy | |
| 5,165,736 A * | 11/1992 | De Waal ............... | F16L 23/14 |
| | | | 285/424 |
| 5,189,784 A | 3/1993 | Welty | |
| 5,243,750 A | 9/1993 | Welty | |
| 5,283,944 A | 2/1994 | Goodhue | |
| 5,321,880 A | 6/1994 | Goodhue | |
| 5,342,100 A | 8/1994 | Goodhue | |
| 5,436,423 A | 7/1995 | Welty | |
| 5,450,879 A | 9/1995 | Toben | |
| 5,653,482 A | 8/1997 | Ficchi, Jr. | |
| 6,810,570 B2 | 11/2004 | Fischer et al. | |
| 2009/0309358 A1 | 12/2009 | Gray | |
| 2014/0048167 A1 * | 2/2014 | Gudenburr ............... | F16L 23/14 |
| 2014/0202225 A1 | 7/2014 | Runyan | |

FOREIGN PATENT DOCUMENTS

| | | |
|---|---|---|
| DE | 202013000040 | 3/2013 |
| FR | 2844024 | 3/2004 |
| GB | 1550836 | 8/1979 |

OTHER PUBLICATIONS

Written Opinion for corresponding PCT Application No. PCT/US2014/069841 dated Mar. 19, 2015.

* cited by examiner

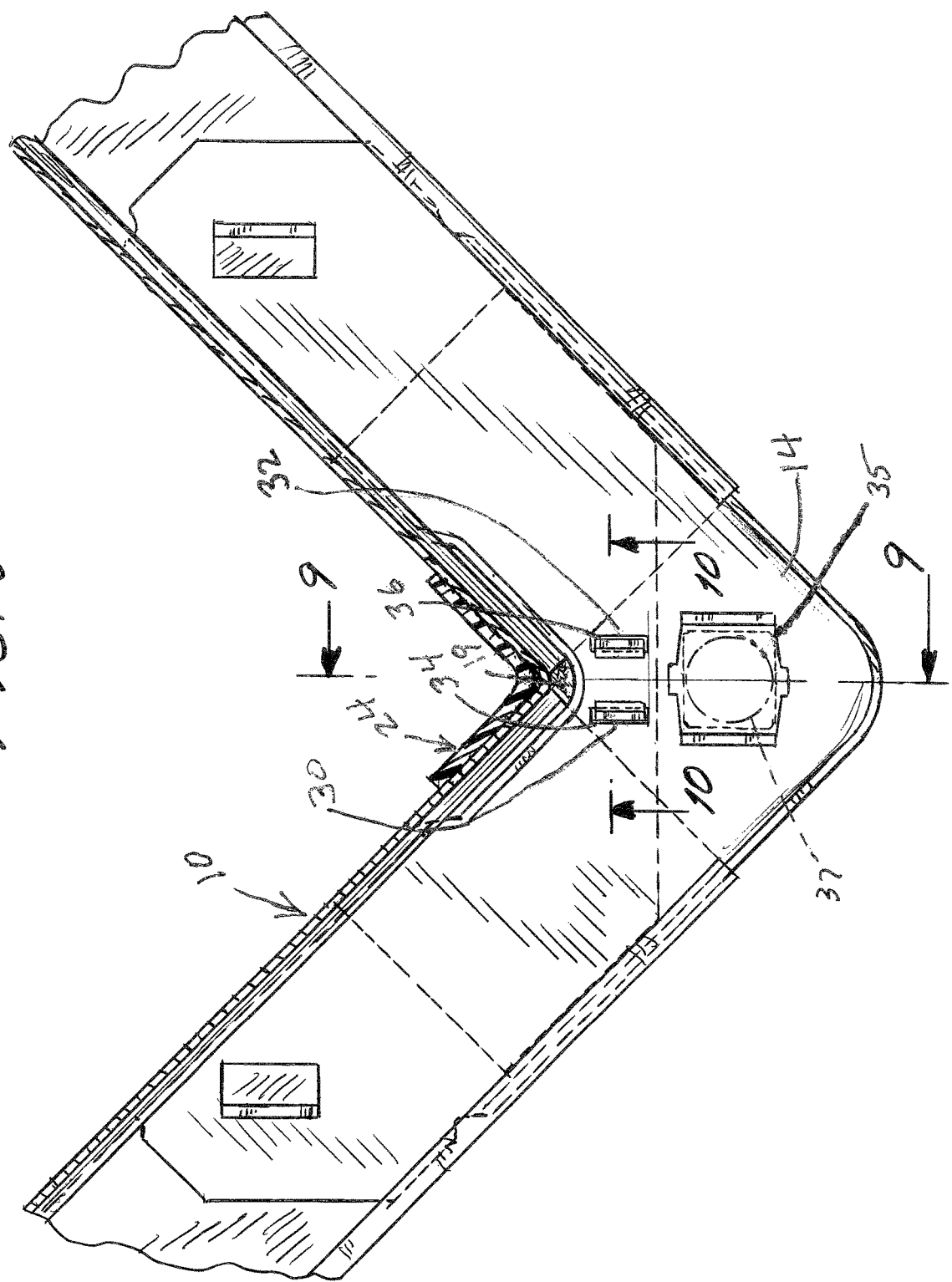

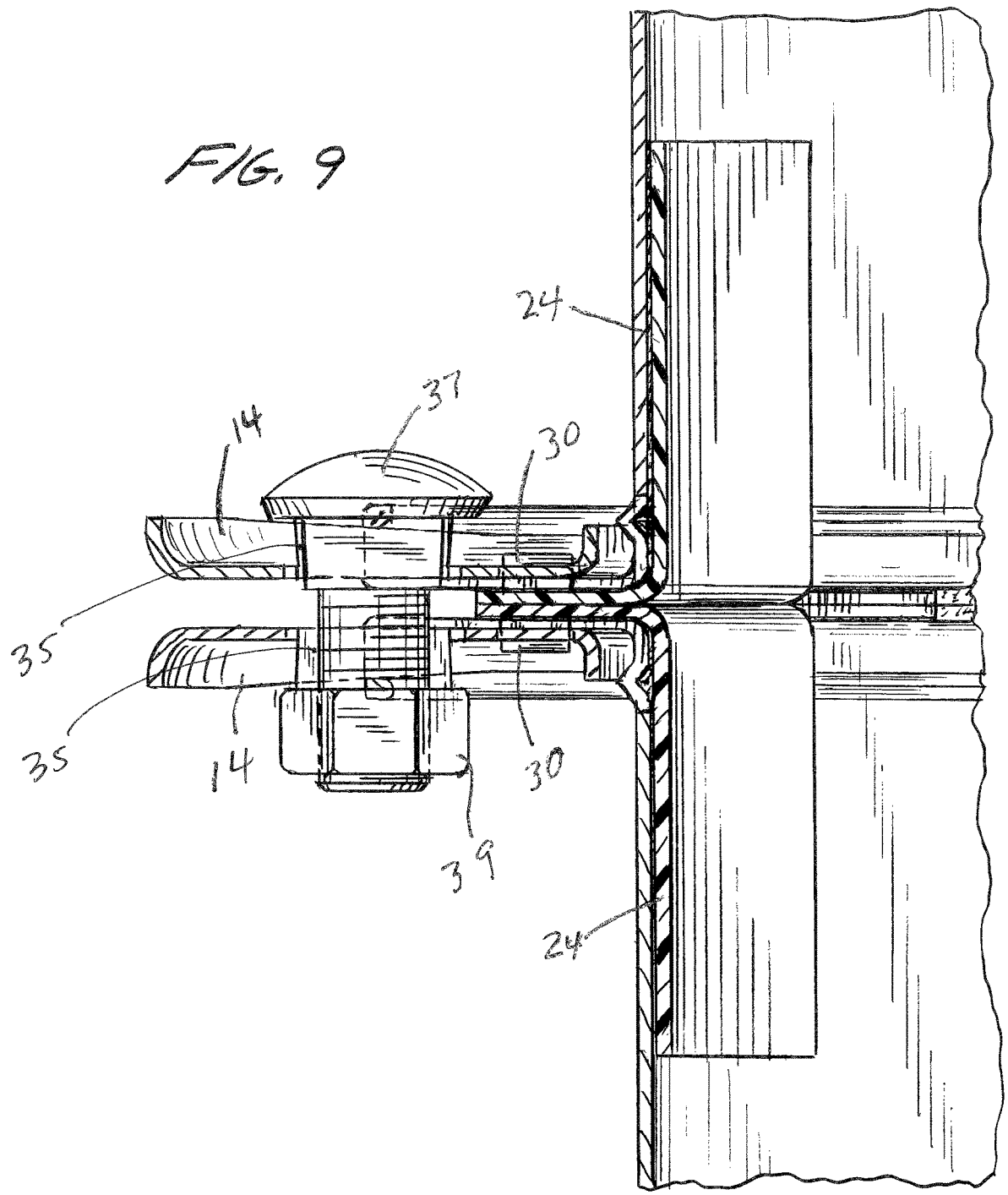

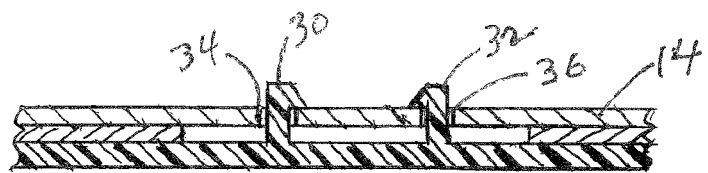
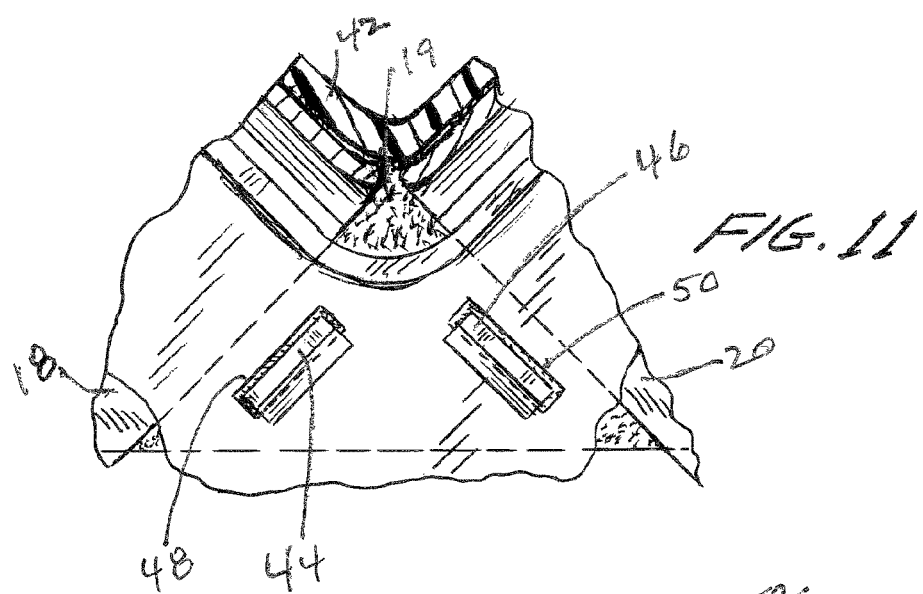
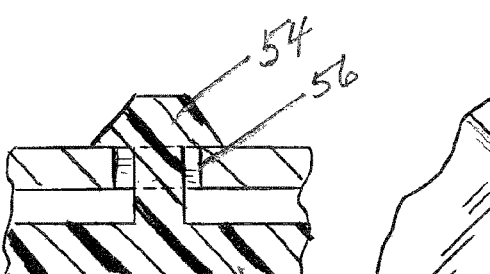
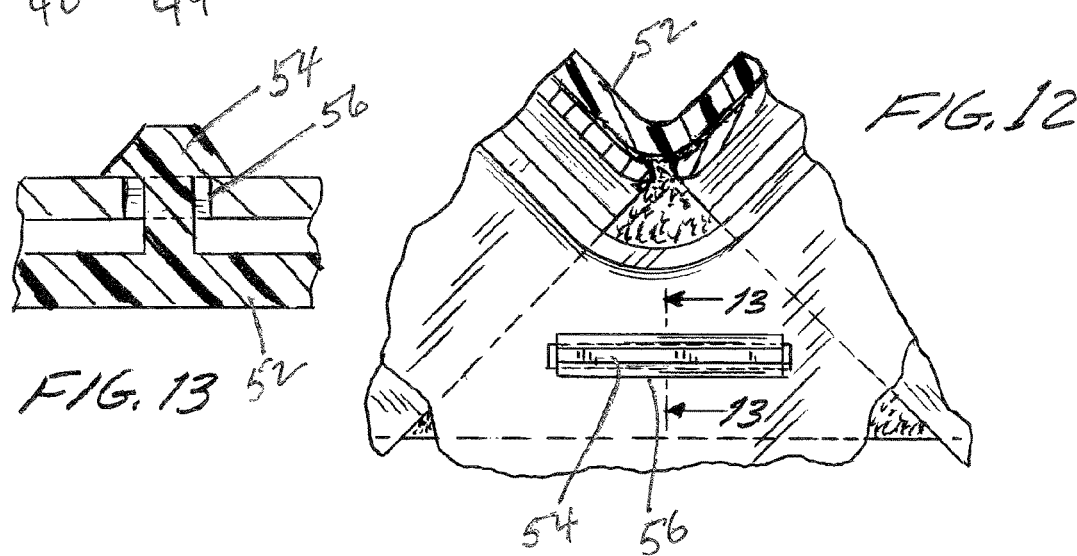

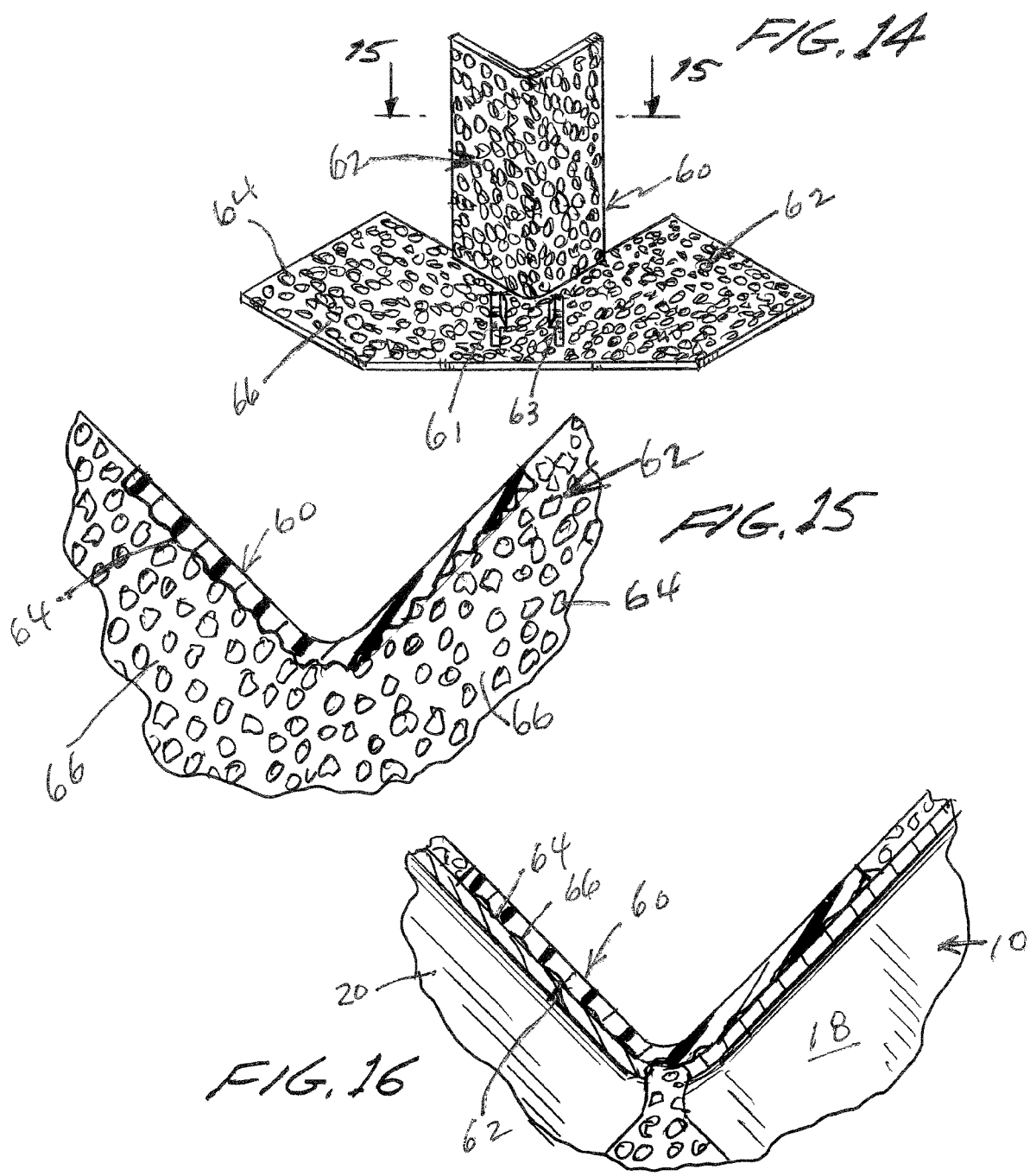

CORNER SEAL DEVICE FOR DUCTWORK FOR CONDITIONED AIR AND METHOD OF ASSEMBLY OF SUCH DUCTWORK TO PREVENT AIR LEAKS

CROSS REFERENCE TO RELATED APPLICATIONS

This application is a national phase of PCT application No. PCT/US2014/069841, filed Dec. 11, 2014, which claims priority to U.S. provisional patent application No. 61/915,348, filed Dec. 12, 2013, all of which are incorporated herein by reference thereto.

BACKGROUND OF THE INVENTION

1. Field of the Invention

The present invention relates to the assembly of ductwork sections having channel flanges at their ends. More particularly, the invention relates to a method of assembly of such flanged ductwork sections utilizing a unique sealing bracket which quickly and efficiently seals the assembled ductwork sections such that air leaks are prevented.

2. Description of the Related Art

Presently, flanged ductwork sections which are formed with such channel flanges, are assembled by the placement of angle plates into the corners defined by the channel flanges positioned at the ends of the ductwork sections, as more particularly described in U.S. Pat. Nos. 5,283,944, 5,321,880 and 5,342,100 to Goodhue. The contents of U.S. Pat. Nos. 5,283,944, 5,321,880 and 5,342,100 are incorporated in their entirety by reference herein and made a part of this application.

More particularly, the Goodhue patents relate to angle plates for assembling such ductwork sections having transverse duct flanges by placement of the angle plate into an open space or "notch" in each corner of the duct, the notch being defined by the ends of the transversely oriented flanges of the ducts. Once the angled plates are fully seated in the ductwork flanges, the side edges of the ductwork flanges adjacent the notch are crimped into overlying relation with respect to the angle plate to create a channel so as to assure interlocking of the angle plates with the ducts.

In practice, the flanges can be structured and dimensioned to provide interlocking of the angle plate, without need for crimping the side edges of the flanges after placement of the angle plate.

After the angle plates are secured with respect to the ducts, a suitable sealant or gasket is applied to the flange surfaces and the ducts are secured together by bolts passing through each respective pair of face-to-face angle plates and tightened by nuts to provide an airtight seal.

In general, the assembly of the angle plates with the ductwork sections as described in the Goodhue patents is accomplished by automatic machine operations as described in the Goodhue patents.

More recently, U.S. Pat. No. 8,875,388, dated Nov. 4, 2014 relates to an apparatus and method for placement of such angle plates in transverse duct flanges of the type described in the Goodhue patents. Moreover, US Published Application No. US 2014/0319165, dated Oct. 30, 2014 relates to an apparatus and method for placement of such angle plates in transverse duct flanges, utilizing a package purportedly for use in the apparatus for automatically assembling the angle plates in the channel shaped flanges. The disclosures of U.S. Pat. No. 8,875,388 and Application Publication No. US 2014/0319165 are incorporated in their entirety herein by reference herein, and made a part of this application.

Disadvantages of the Current System of Assembling Flanged Ductwork Sections

One disadvantage of the present system of assembling such flanged ductwork sections relates to the presence of a notch between the edges of adjacent flanges, and an aperture in each of the corners of the ductwork section between adjacent flanges and adjacent the notch. In practice, the ductwork section is initially formed from a metal such as galvanized sheet steel, and is made into an elongated box-like member of one-piece or multiple-piece construction. The ductwork section will generally have a rectangular cross-section, and for most applications, a square cross-section. Such ductwork can also be made of galvanized steel, stainless steel, aluminum, or any other materials approved by local codes for heating, ventilating and air conditioning systems (hereinafter sometimes referred to as "HVAC" systems).

To create the flanges, a slit is introduced at each corner of the ductwork section, followed by bending of the marginal portions of the metal adjacent each slit. Since the slits may be made by manually applied cuts in the metal, they are not always identical. Accordingly, when the flanges are formed by bending the respective marginal portions adjacent each slit, the aforementioned notch is formed in the corner of the duct, and a small aperture is often formed where the flanges meet at the duct wall. Since this small aperture in the corners of the duct are potential sources of leaks of conditioned air, in order to avoid such loss of conditioned air, the apertures must be sealed.

The angle plate is positioned in contact with adjacent flanges and is progressively pressed into contact with the flanges. The marginal edge portions of the flanges extending outwardly of the legs of the angle plate are then crimped over the edge portions of the legs of the angle plate to create a channel which secures the angle plate in position with respect to the ductwork section.

The Sealing Step

Since sealing of the apertures must be accomplished with materials approved for heating, ventilating and air conditioning, the sealants usually applied to the apertures are generally of the type which require a relatively extensive curing time, sometimes up to approximately twenty-four hours. Therefore it can be readily appreciated that such twenty-four hour period provides a relatively significant delay in the production schedule of the ductwork sections.

I have invented a corner seal device which is quickly applied to each of the four corners of the ductwork assembly so as to extend across the notch between the orthogonal flanges, while at the same time, sealing the unwanted air leaks created by the duct forming slits, thereby resulting in improved efficiency for assembly and operation of such ductwork sections. My invention also relates to improvements in such ductwork, and an improved method of assembling such ductwork, which method is cost effective and which eliminates costly labor expenses. My invention therefore improves such air conditioning systems which incorporate such ductwork sections.

SUMMARY OF THE INVENTION

The present invention relates to a corner seal device for ductwork for conditioned air, and a method of assembly of such ductwork in which known potential air leaks are readily prevented when the ductwork sections are connected together to direct conditioned air in an air conditioning and/or heating system.

In particular, the corner seal device is assembled with the ductwork sections and corner mounting angle plates for use in connecting ductwork sections in a system which is free of air leaks.

The corner seal device of the present invention eliminates costly time delays and expenses by providing a quick connecting seal device which eliminates loss of conditioned air.

A device for sealing a space defined between respective end portions of an adjacent pair of orthogonal flange members of a conditioned air duct having a generally rectangular cross-section is disclosed, which comprises, a first plate member having a surface dimensioned and configured for placement in face-to-face relation with the respective adjacent upper surface portions of said adjacent flange members, and a leg member extending away from a generally central portion of said plate member and being generally perpendicular thereto, the leg member comprising second and third orthogonal plate members having respectively orthogonal surface portions configured and dimensioned to engage corresponding respective adjacent orthogonal inner wall surface portions of said duct when said first plate member is positioned on the flange members.

According to the invention, the leg member is generally integrally attached to the plate member, or monolithically formed therewith.

The first plate member and the leg member are preferably made of at least one of a metal and plastic. The metal may be steel, galvanized steel, stainless steel or aluminum, for example.

The surface portions of the first plate member and the leg member which are adapted to contact the respective flange members and the corresponding respective inner wall surface portions of the duct are coated with adhesive sealing material for attachment to the respective surface portions, so as to cover and seal the space between the flange members to prevent leakage of conditioned air therethrough.

The adhesive sealing material should be approved for heating, ventilating and air conditioning systems. Furthermore, the first plate member is preferably configured to define a pair of orthogonal sections dimensioned for respective face-to-face engagement with the corresponding pair of orthogonal flange members, and the second and third plate members of the leg member are configured, dimensioned and positioned for face-to-face engagement with the corresponding orthogonal inner wall surface portions of the duct adjacent the corner of the duct.

The first plate member is preferably provided with at least one attachment device for attachment of the plate member in position with respect to the orthogonal flange members and the wall portions of the duct. Further, the angle plate member is attached to the flange members at the corner of the duct, and the at least one attachment device of the first plate member is configured and dimensioned for locking attachment to the angle plate.

The attachment device of the invention is preferably comprised of a pair of locking attachment prongs extending perpendicular to the plate member, and being configured to enter correspondingly dimensioned apertures in the corner angle plate. The locking attachment prongs are configured and dimensioned to become resiliently engaged with the apertures in the angle plate to retain the first plate member and the second and third plates of the leg member in position with respect to the ductwork.

The at least one attachment device may also be comprised of upstanding side walls dimensioned, configured and adapted to resiliently engage the flange members of the duct to attach the plate member and the leg member to the duct. In all embodiments disclosed, the rectangular shaped conditioned air also contemplates a duct having a square cross-section.

A sealing device is also disclosed for sealing flanged sections of ductwork attached together with the flanges positioned in face-to-face relation to fond a continuous duct system for conducting conditioned air, the flanges being respectively oriented at right angles to each other and to the ductwork, the flanges defining at least one aperture between their end portions, which may permit leakage of conditioned air therethrough, which comprises a leg member having generally orthogonal plate members adapted to be positioned in engagement with adjacent corner wall portions of the ductwork section, the leg member further having a plate member integrally attached thereto and generally perpendicular thereto, the plate member being configured and dimensioned to be placed in face-to-face relation with respective adjacent surface portions of the flanges. The leg member and the plate member are respectively provided with a soft sealing material on all surfaces coming into contact with the respective surface portions of the ductwork when inserted into the corner of the ductwork to prevent leakage of conditioned air.

A duct is also disclosed for directing conditioned air in a heating, ventilating and air conditioning type system, which comprises a first ductwork section having a generally rectangular cross section, each corner of the rectangular ductwork section having a pair of channel flanges extending orthogonally from the respective duct walls and orthogonally with respect to each other. The end portions of the adjacent flanges define an open space at each corner of the ductwork section. An angle plate is seated at each corner of the ductwork section in the channel flanges for attaching the first section of ductwork to a second identical section of ductwork, each angle plate including two legs formed together in angular relation by an integral corner.

A device is provided for sealing the open space between said flanges, the device comprising, a first plate member having a surface portion dimensioned and configured for placement in face-to-face relation with the respective adjacent upper surface portions of the adjacent orthogonal flanges, and a leg member extending generally from, and generally perpendicular to a central portion of said plate member, the leg member being comprised of respective orthogonal second and third respective plate members having surface portions configured and dimensioned to engage corresponding respective adjacent orthogonal inner wall surface portions of said ductwork section when the plate member is positioned on the flange members, thereby providing an airtight seal for at least a portion of the open space between the flange members.

A method of attaching two sections of flanged ductwork so as to provide an airtight duct for conducting conditioned air in a heating, ventilating and air conditioning system, the ductwork sections having a generally rectangular cross-section and the flanges of the ductwork being generally orthogonal to each other is disclosed, comprising a) positioning an angle plate into contact with one corner of a first ductwork section and progressively pressing the angle plate into the flanges, the angle plate including two legs formed together in angular relation, the flanges defining an open space between their respective ends, and further, having side edge marginal portions adjacent said each leg of said angle plate, b) crimping the marginal side edge portions of the flanges over each leg of the angle plate to form a channel which positively locks the angle plate with respect to the adjacent flanges, c) positioning a device for sealing the open space between the flanges, the device comprising a plate member having a surface dimensioned and configured for placement in face-to-face relation with the respective adjacent upper surface portions of the adjacent flanges, a leg member extending away from a generally central portion of the plate member and being generally perpendicular thereto, the leg member having orthogonal surface portions configured and dimensioned to engage corresponding respective adjacent orthogonal inner wall surface portions of the duct when the plate member is positioned on the flanges. At least one attachment device is provided for attachment of the plate member in position with respect to the flanges, and an adhesive sealing material is provided on all surface portions of the plate member and the leg member which contact the flange member and the surface portions of the duct walls.

The method also comprises repeating the steps a), b) and c) on the remaining corners of the first ductwork section, and then repeating all of the previously recited steps on the second section of ductwork, positioning the first and second sections of ductwork in end-to-end relation by positioning the flange members in face-to-face relation, and inserting at least one bolt-type fastener through respective aligned apertures of adjacent angle corners of the first and second ductwork sections, and securing the ductwork sections together with a nut-type fastener over each the bolt-type fastener at each corner of the ductwork sections.

A heating, ventilating and air conditioning system which includes ductwork for conducting conditioned air therethrough, said ductwork structured and configured according to the invention as disclosed herein.

BRIEF DESCRIPTION OF THE DRAWINGS

Preferred embodiments of the invention are described herein with reference to the drawings, wherein:

FIG. 8 is a top plan view of the assembled components of FIG. 7, showing the corner seal device of the present invention in cross-section;

FIG. 9 is a partial cross-sectional view, taken along lines 9-9 of FIG. 8, illustrating one corner of the two items of flanged ductwork shown in FIGS. 7 and 8, assembled together with corner angle plates and corner seal devices of the present invention, together with the addition of a bolt and nut, this assembly being part of a leak-proof ductwork system for conducting conditioned air, without loss of such conditioned air;

FIG. 10 is a cross-sectional view, taken along lines 10-10 of FIG. 8, illustrating one preferred embodiment of locking attachment prongs of the corner seal device of the present invention in locking engagement with the corner angle plate;

FIG. 11 is a top view, partially cut away, of an assembled ductwork corner similar to FIGS. 7 and 8, showing an alternative embodiment of the corner seal device of the present invention, incorporating an alternative arrangement of locking attachment prongs, said prongs being in perpendicular relation with each other in this embodiment;

FIG. 12 is a top plan view similar to FIG. 11, showing yet another alternative embodiment of the corner seal device of the present invention, and incorporating yet another alternative arrangement of the locking attachment prong feature, this arrangement being in the form of a single locking attachment prong having a locking head having opposed sloped surfaces for insertion into an appropriately dimensioned and configured elongated slot in interference relation with the elongated slot provided in the corner mounting angle plate for locked engage relation with the slot;

FIG. 13 is a cross-sectional view, taken along lines 13-13 of FIG. 12, illustrating the engagement by the single attachment locking prong of the corner seal device of the invention shown in FIG. 12, with the corner angle mounting plate of the assembly;

FIG. 14 is a top perspective view of yet another alternative embodiment of the corner seal device of the present invention, incorporating a relatively soft plastic material having self-sealing surfaces somewhat similar to so-called "orange peel"-type surfaces, such orange peel-type surface having a plurality of randomly positioned and spaced "bumps" and "valleys", which provide self-sealing when placed in engagement with the relatively flat surfaces of the ductwork and associated flanges, this embodiment eliminating the need for an additional sealant;

FIG. 15 is a partial cross-sectional view, taken along lines 15-15 of FIG. 14;

FIG. 16 is a top plan view, partially in cross-section, of one corner of a section of flanged ductwork having the corner seal device of the present invention as shown in FIGS. 14 and 15, placed in position in the ductwork section as shown in the previous views;

DETAILED DESCRIPTION OF THE PREFERRED EMBODIMENTS

In the description which follows, reference is sometimes made to a corner structure of a conditioned air duct. Such descriptions are illustrative of a typical corner of the ductwork. Each such section of ductwork which has a rectangular section generally has four of such corner structures. The expression "rectangular" duct section is also meant to contemplate such duct sections having a square cross-section.

Figure 1:
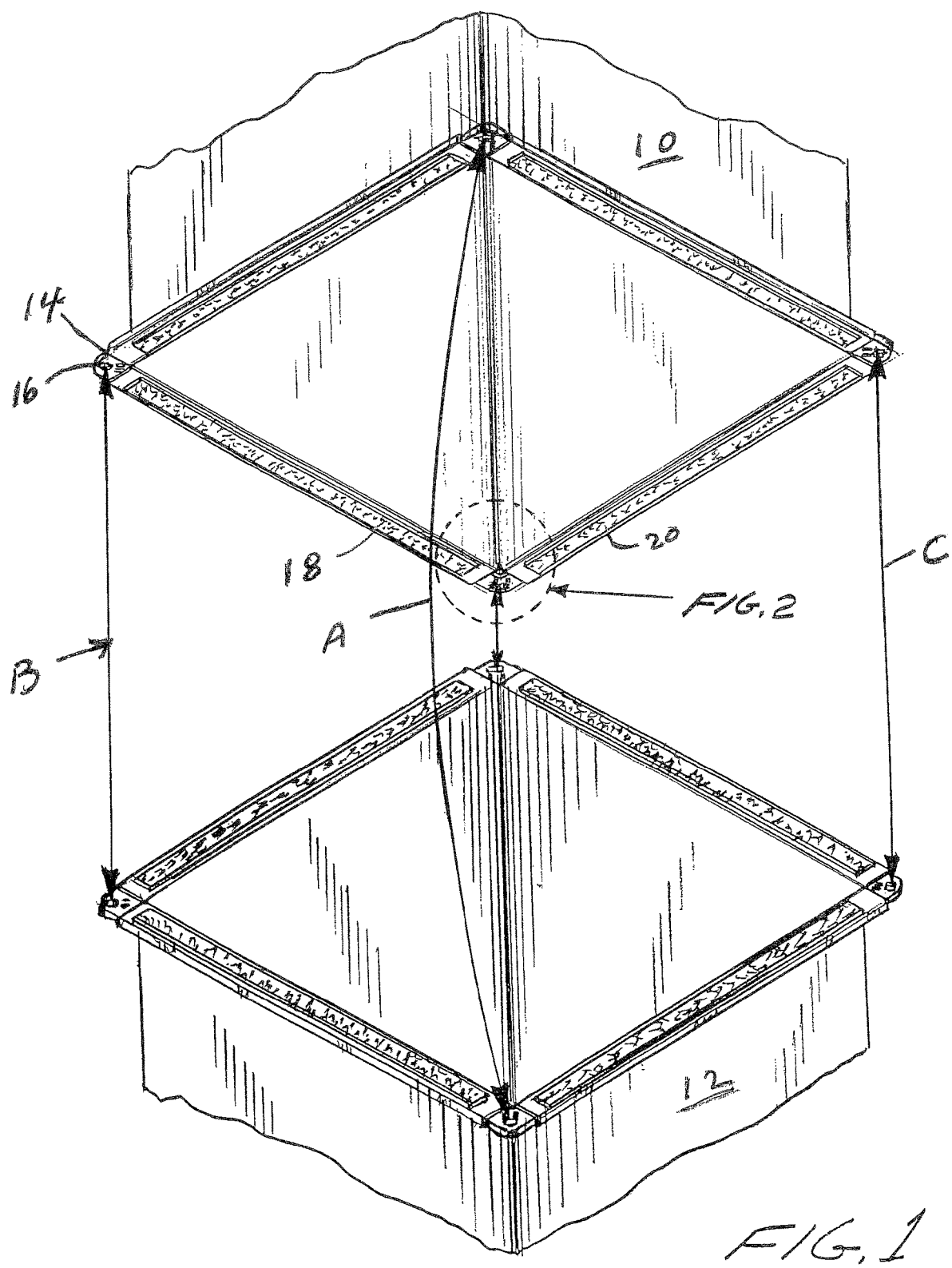
FIG. 1 is a perspective view of two sections of flanged ductwork having a corner mounting angle plate attached at each corner of the respective ductwork sections, and positioned for engagement with each other and attachment by suitable fasteners to produce a continuous duct system for conditioned air.

Referring initially to FIG. 1, there is shown a pair of flanged ductwork sections 10,12 positioned for attachment in end-to-end relation as shown by the arrows A, B, and C, with suitable fasteners according to known practice. The faces of each such section of ductwork are to be attached in face-to-face relation. In general, the ductwork sections are attached to each other by positioning the ends in face-to-face relation and by passing a bolt through apertures 16 of the known corner mounting angle plates 14 similar to the angle plates disclosed in U.S. Pat. Nos. 5,283,944, 5,321,880 and 5,342,100. In general, the ductwork sections and the corner mounting angle plates are usually made of steel which may be galvanized, and the ductwork sections are usually of square cross-section. However any approved materials for such ductwork and attachment devices is contemplated herein.

Figure 2:
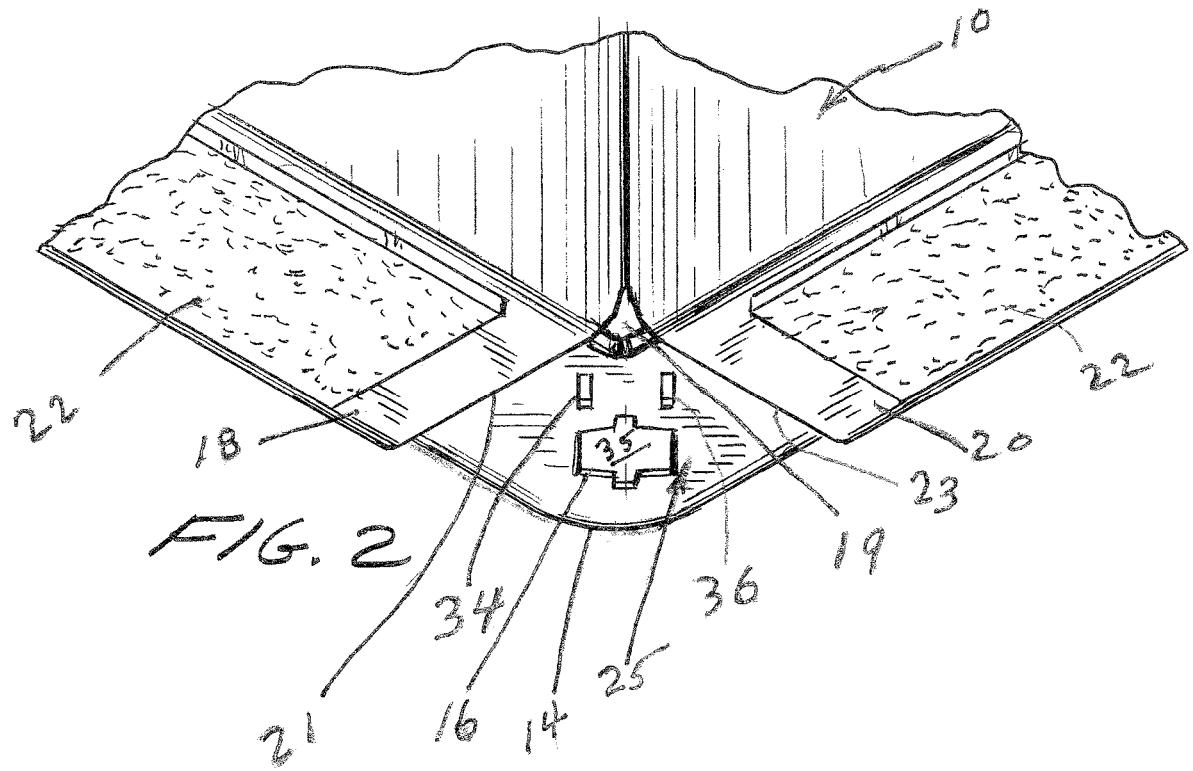
FIG. 2 is an enlarged top perspective view of the assembled corner mounting angle plate and flanged section of ductwork which is encircled by dash lines in FIG. 1, and which is intended to be attached to an identical flanged section of ductwork therebelow, as illustrated by arrows A, B and C in FIG. 1, the view in FIG. 2 illustrating the notch between adjacent orthogonal flanges and the aperture in the corner between the respective flange formations which can potentially result in an unwanted air leak in the ductwork.

FIG. 2 is an enlarged top perspective view of the assembled corner mounting angle plate and flanged section of ductwork which is encircled in FIG. 1. The ductwork is generally rectangular, and often square in cross-section, such that each section of ductwork will include four of such corner structures as shown.

In FIG. 2, ductwork section 10 is provided with example flanges 18, 20 which are bent away approximately 90° from the ductwork walls as shown. As noted, the steel ductwork can be of one piece or multiple piece construction. After formation of the basic duct, a cut is introduced at each corner, and the flanges are formed by bending the marginal portions at an approximate angle of 90° to the duct wall, leaving rectangular corner notch 25 defined by flange edges 21, 23. Due to occasional inconsistencies in the depth of the cut made in the ductwork corner, when the flanges are bent, a small aperture 19 is often formed, which is potentially a source of leakage of the conditioned air which is directed through the ductwork sections.

To prevent loss of conditioned air (and consequent energy loss) a suitable approved sealant is generally applied to aperture 19 and then permitted to cure. In particular, the sealant must be approved for all HVAC (i.e., heating, ventilating, and air conditioning) systems. Since curing time for such approved sealants can take up to 24 hours, the application of the sealant, combined with the loss of time for the sealant to be cured, results in a measurable inefficiency in the method of assembling and constructing such ductwork systems.

Figure 3:
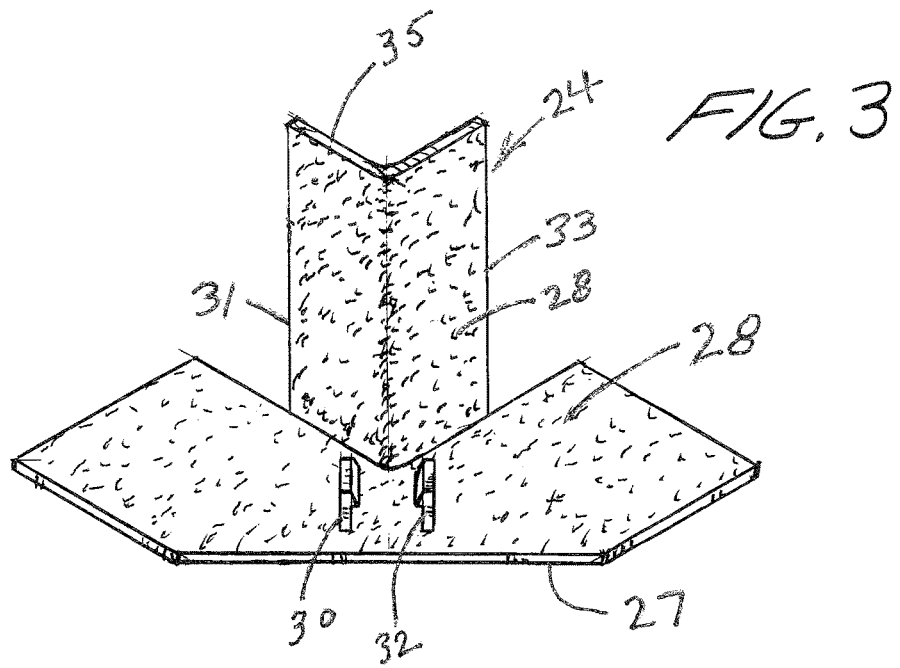
FIG. 3 is a top perspective view of one preferred embodiment of a corner seal device constructed according to the present invention, this device having an adhesive-type approved sealant on the relevant surfaces, and being intended to be attached to a flanged section of ductwork of the type shown in FIGS. 1 and 2, to extend across the notch created when the flanges are formed, and seal the small aperture between the flanges of the ductwork.

To eliminate the unwanted air leaking aperture 19, a corner seal device 24 as shown in FIG. 3 will be incorporated into the assembly of the flanged ductwork section as will be described. As can be seen, the corner seal device can be readily applied to the assembly of the angle plate and the ductwork flanges prior to completing the attachment of the ductwork sections.

Further sealing of the entire assembly is generally provided by a suitable strip of soft gasket material 22, generally of approximately ⅛ inch thickness, adhesively applied to the flanges 18, 20 to be positioned between them in sealed relation. In general, the gasket material may be self-sticking, or it may be provided with an additional adhesive layer covered by a suitable silicone release paper or the like.

In FIG. 3, the corner seal device 24 constructed according to the present invention is shown. The corner seal device 24 is preferably made of one piece, such as metal or a plastic material which meets national and local air conditioning and heating codes. The corner seal device may be of one piece construction as shown; however, multiple pieces attached to form an integral seal are also contemplated. The corner seal device can be made of galvanized steel, stainless steel, aluminum or plastic. While metal or plastic is primarily contemplated for the corner seal device, alternative materials which meet local HVAC standards are also contemplated.

Referring to FIG. 3, the corner seat device 24 includes a first plate member 27 and a leg member 26 comprised of second and third plate members 31, 33, formed adjacent and monolithically with plate member 27. Plate member 27 is perpendicular to second and third plate members 31, 33, as shown, and second and third plate members 31, 33 are orthogonal to each other so as to engage the perpendicular duct walls at each corner of the ductwork section.

In the preferred embodiment shown in FIG. 3, the respective surfaces of the plate members 31, 33 are coated with a suitable adhesive sealing material 28 of a type approved for use in heating and air conditioning codes. The sealing material is depicted by the stippled portions on the respective surfaces as shown in FIG. 3.

One embodiment of the seal device 24 shown in FIG. 3, includes a pair of upstanding resilient locking attachment prongs 30, 32 which are positioned to be inserted into correspondingly shaped rectangular apertures 34, 36 in the corner mounting angle plate 14 as will be described in more detail in connection with FIGS. 4-9.

Figure 4:
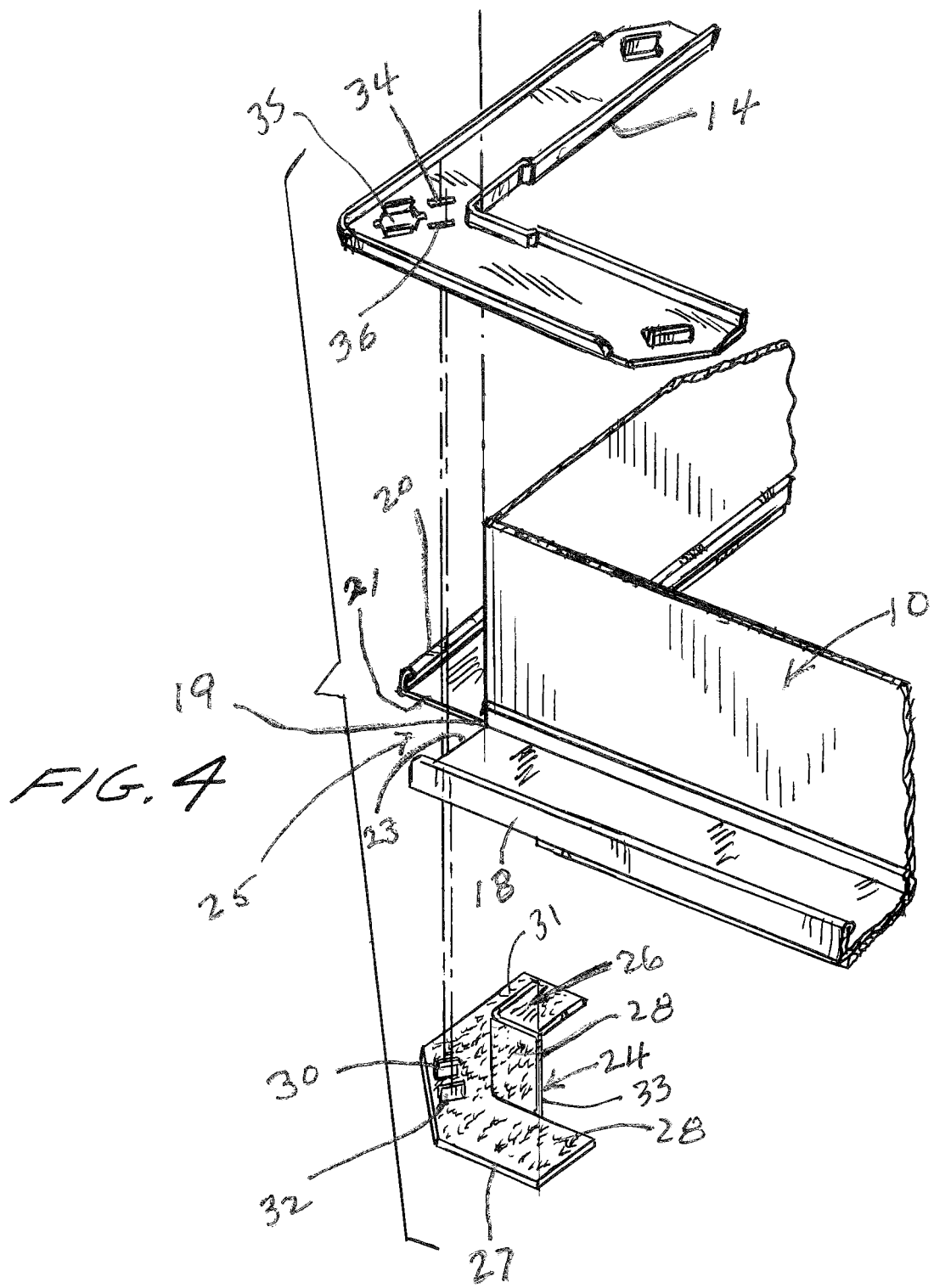
FIG. 4 is an enlarged top perspective view, with parts separated, of a flanged section of ductwork prior to assembly with a corner mounting angle plate and the corner seal device constructed according to the present invention.
Figure 5:
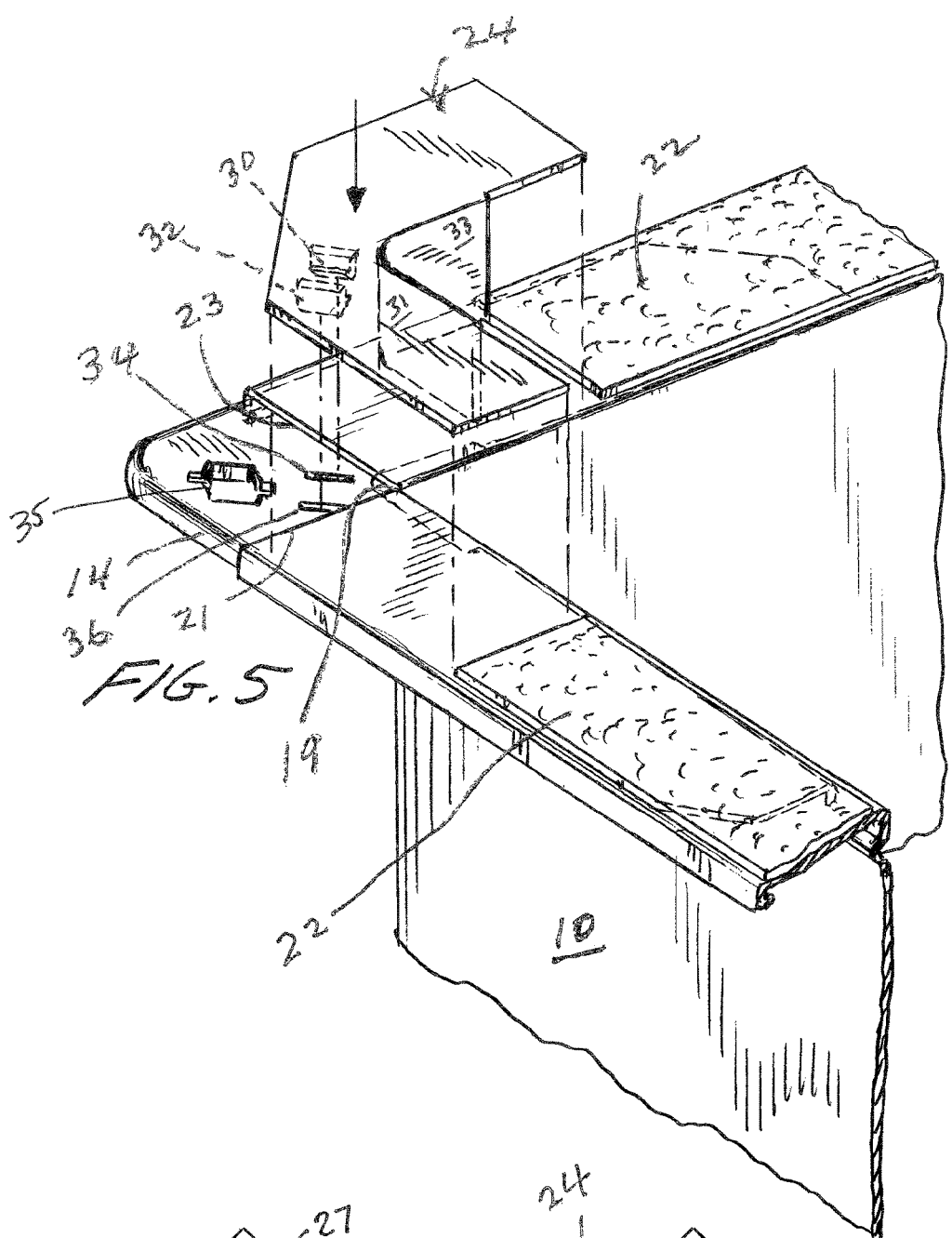
FIG. 5 is an enlarged top perspective view similar to FIG. 4, but of the opposite side of the ductwork, illustrating the flanged ductwork of FIG. 4, assembled with the corner mounting angle plate, and ready for assembly with the corner seal device of the present invention, shown immediately thereabove.
Figure 6:
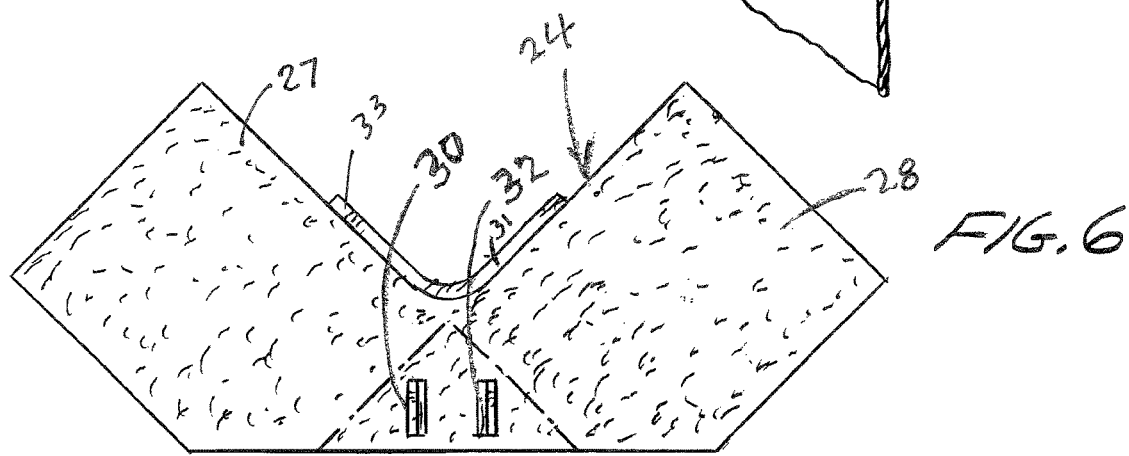
FIG. 6 is a top plan view of the corner seal device of the present invention, illustrating one preferred embodiment, provided with dual facing locking attachment prongs.

In FIG. 4 there is shown an enlarged view, with parts separated for illustration purposes, of a corner of a flanged section of ductwork 10 prior to assembly with a corner angle plate 14 and a corner seal device 24 of the present invention. Ductwork section 10 is in position to be assembled with corner mounting angle plate 14 as shown in FIG. 5. Corner seal device 24 of the present invention is then attached to the inside corner of the ductwork section 10, covering a portion of the space defined as corner notch 25, which in turn is defined by flange edges 21, 23, as shown in FIG. 4.

In the embodiment shown in FIGS. 3-6, the corner seal device 24 has a coating of suitable approved adhesive sealing material 28 on the inner surfaces as shown, which will adhere to the ductwork section between the flanges 18, 20, while covering not only a part of the corner notch 25, but also sealing unwanted aperture 19 in the ductwork.

Figure 7:
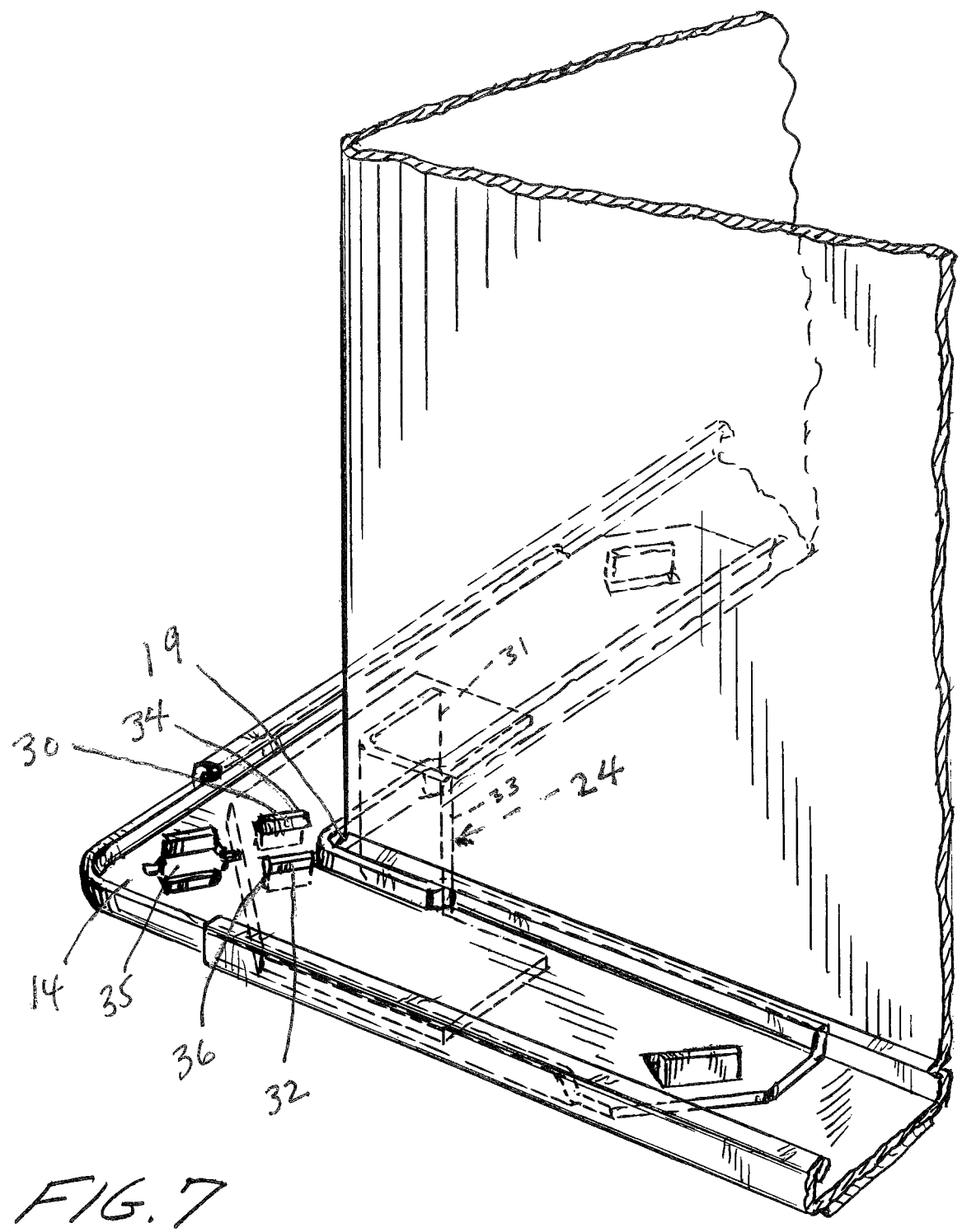
FIG. 7 is a top perspective view of the assembled corner portion of the flanged section of ductwork of FIGS. 4 and 5, assembled with the corner mounting angle plate shown in FIG. 4, and further, with the corner seal device of FIG. 3, shown in phantom lines.

FIG. 7 is a top perspective view of the corner portion of the flanged section of ductwork 10 of FIG. 1, assembled with the corner mounting angle plate 14 shown in FIGS. 1 and 4, and with the addition of corner seal device 24 of the invention (is shown in phantom lines) installed to cover aperture 19 which is shown more clearly in FIG. 2. As well, a portion of the space defined by corner notch 25 will also be covered by the seal device of the present invention.

FIG. 8 is a top plan view of the assembled components shown in FIG. 7, showing the corner seal device 24 of the invention, attached to corner mounting angle plate 14 by engagement of upstanding attaching locking prongs 30, 32 with corner mounting angle plate 14 by insertion thereof into rectangular apertures 34, 36 in corner mounting angle plate 14 as shown.

FIG. 9 is a partial cross-sectional view, taken along lines 9-9 of FIG. 8, showing one assembled corner of the components of FIGS. 7 and 8, assembled together with bolt 37 through aperture 35 and nut 39 to form part of a leakproof ductwork system for conditioned air. Identical corner seal devices 24 of the present invention are shown in opposed relation and in cross-section, attached to corner mounting angle plates 14 by upstanding attachment locking prongs 30 in apertures 34. The locking prongs 30, 32 and respective apertures 34, 36 are shown more clearly in FIG. 10.

FIG. 10 is a cross-sectional view taken along lines 10-10 of FIG. 8, illustrating the attachment locking prongs 30, 32 of the corner seal device of the present invention in locking engagement with the angled corner mounting angle plate 14 through respective apertures 34, 36.

FIG. 11 is a top view, partially cut away, and partially in cross-section, of an assembled ductwork corner similar to FIGS. 5, 7 and 8, showing an alternative embodiment of the corner seal device 42 of the present invention, incorporating an alternative arrangement of the locking attachment prongs 44, 46, oriented at approximately 90° to each other and inserted into respective apertures 48, 50 in corner mounting angle plate 42 to seal aperture 19 formed between flanges 18, 20 as disclosed previously.

FIG. 12 is a top plan view, partially cutaway, similar to FIG. 11, showing yet another alternative embodiment of the corner seal device 52 of the present invention, incorporating a single upstanding attachment locking prong 54 dimensioned and positioned for insertion in interference relation into correspondingly positioned and dimensioned aperture 56 for locking attachment as shown in cross-section in FIG. 13.

FIG. 14 is a top perspective view of yet another alternative embodiment of the corner seal device 60 of the present invention, wherein the sealing surfaces are made of a relatively soft and resilient self sealing material having "orange peel"-type surfaces 62 comprised of a soft material defining a plurality of randomly positioned and randomly configured bumps 64 and valleys 66, which provide a self-sealing effect when positioned in engagement with the respective relatively smooth and flat surfaces of the corner mounting angle plate and the ductwork section as disclosed in the previous embodiments. The self-sealing effect is primarily due to the configurations of the bumps 64 and valleys 66, combined with the soft character, the flexibility, and the resilience of the material, which is preferably a plastic material. This embodiment includes locking attachment prongs 61, 63 as shown in FIG. 14.

FIG. 15 is a partial cross-sectional view taken along lines 15-15 of FIG. 14.

FIG. 16 is a top plan view partially in cross-section, of the corner seal device of FIGS. 14 and 15 of the present invention, attached in position with respect to a section of ductwork 10 of the type shown in FIG. 1, and showing the sealing effect of the "orange peel-type" surfaces 62 comprised of relatively soft bumps 64 and valleys 66, in engagement with the relatively smooth surfaces of the ductwork walls and flanges.

Figure 17:
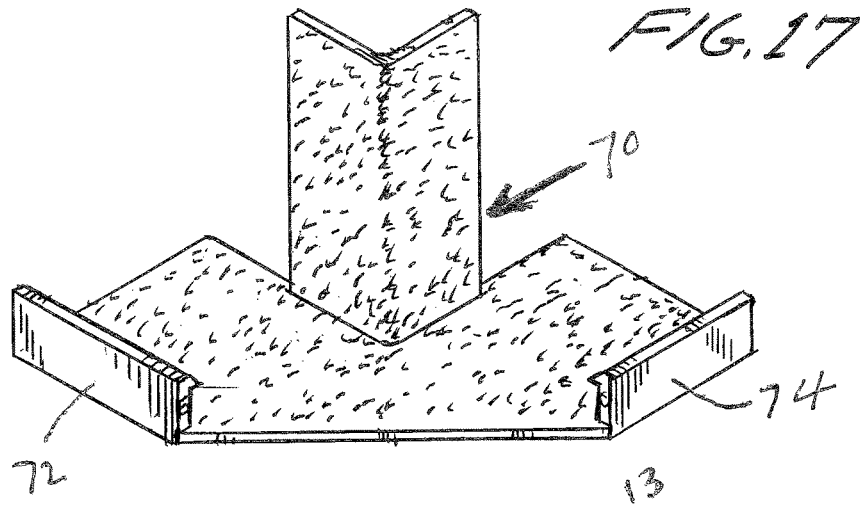
FIG. 17 is a top perspective view of yet another alternative embodiment of the corner seal device of the invention, including edgewise locking attachment prongs arranged to engage and grip the respective edges of the ductwork flanges to attach the corner seal device to the ductwork.
Figure 18:
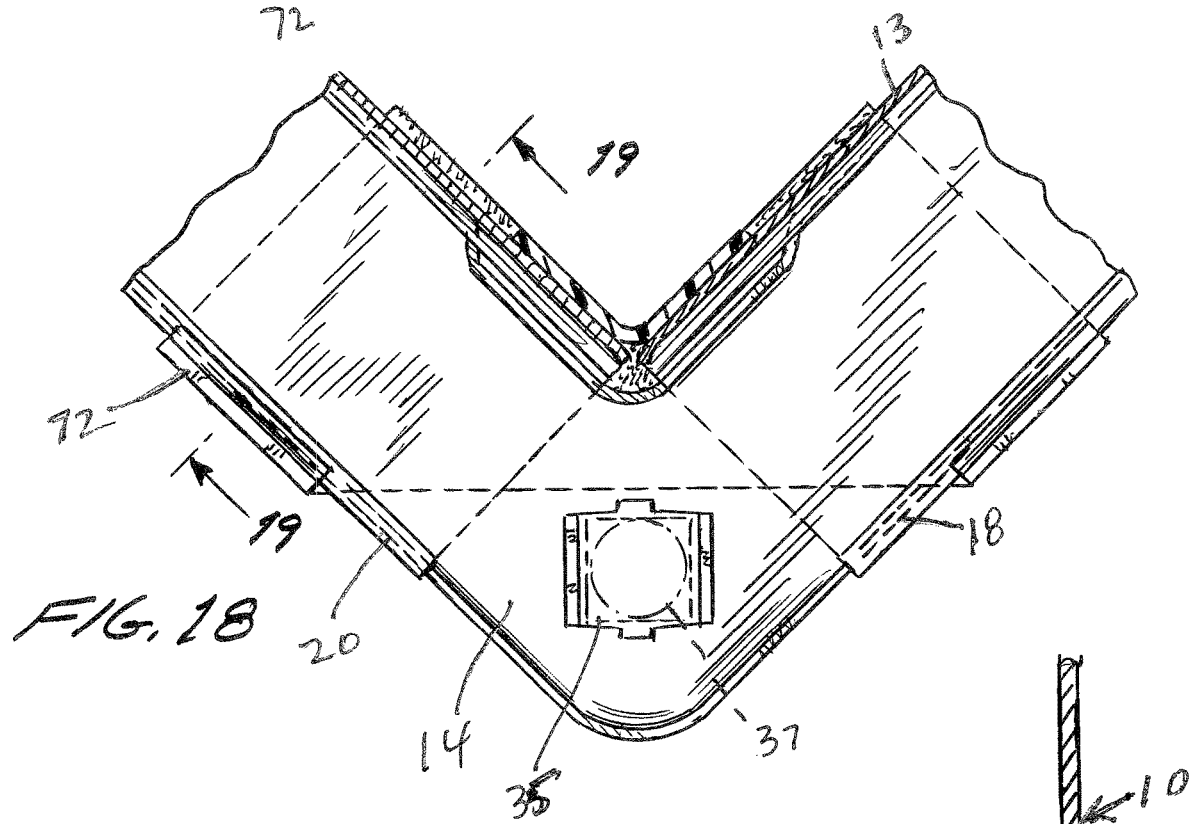
FIG. 18 is a top plan view of an assembled corner section of ductwork similar to FIG. 8, incorporating the corner seal device of FIG. 17.
Figure 19:
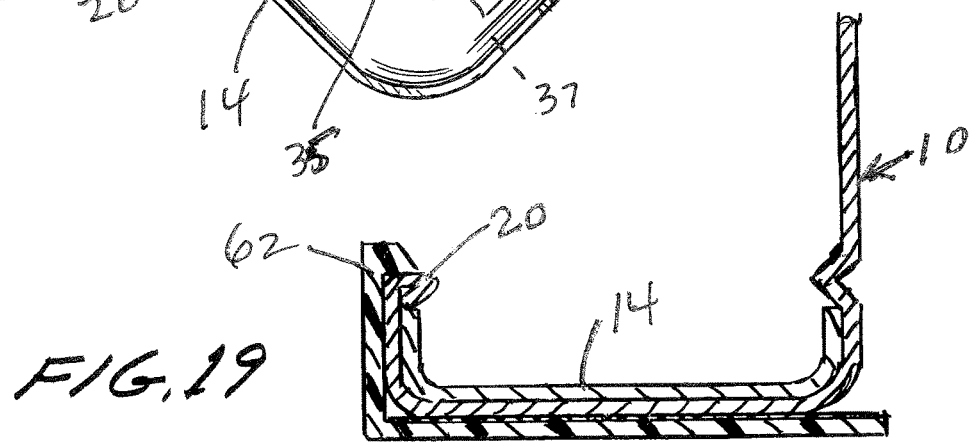
FIG. 19 is a cross-sectional view taken along lines 19-19 of FIG. 18.

FIG. 17 is a top perspective view of yet another embodiment of a corner seal device 70 of the present invention, incorporating alternative attachment locking prongs 72, 74, dimensioned and positioned for locking engagement with the flange members 18, 20 of the ductwork section 10 of FIG. 1, as shown in FIGS. 18 and 19. This system of attachment locking prongs provides stable attachment of the corner seal device 70 with respect to the corner mounting angle plate and the ductwork flanges.

FIG. 18 is a top plan view of a ductwork assembly incorporating the corner seal device of FIG. 17.

FIG. 19 is a cross-sectional view taken along lines 19-19 of FIG. 18.

It can be readily appreciated that upon assembly of such ductwork sections with angle plates, and upon assembling the sections to form continuous ductwork for HVAC systems, the relatively quick insertion of the corner seal device of the present invention, in position as described, provides a unique advantage over the prior art methods of assembly. In particular, such corner seals can be made readily available to the user, with sealing material applied in advance. The sealing material can be covered with an appropriate release paper, i.e., silicone release paper, such that the assembler can quickly select a corner seal, peel the release paper, and then simply drop it into position in the corner of the respective flanged ductwork sections as described.

LIST OF REFERENCES 10, 12 Ductwork Sections
14 Corner Mounting Angle Plate
16 Apertures in Angle Plate
18, 20 Ductwork Flanges
19 Small Aperture/Air Leaking Aperture
21, 23 Flange Edges
22 Soft Gasket Material
24 Corner Seal Device
25 Corner Notch
27 Monolithically Formed Plate Member of Corner Seal Device
28 Adhesive Sealing Material of Corner Seal Device
30, 32 Pair of Upstanding Resilient Locking Attachment Prongs of Corner Seal Device
26 Leg Member of Corner Seal Device 24, Comprised of Plate Members 31, 33
31, 33 Plate Members of Leg Member 35 of Corner Seal Device
34, 36 Rectangular Apertures in Corner Mounting Angle Plate 14
35 Aperture in Corner Angle Plate for Bolt 37
37 Bolt
39 Nut
42 Alternative Embodiment of Corner Seal Device
44, 46 Locking Attachment Prongs of Alternative Corner Seal Device 42
48, 50 Apertures in Corner Mounting Angle Plate of FIG. 11
52 Alternative Embodiment of Corner Seal Device
54 Single Upstanding Locking Attaching Prong of Corner Seal Device 52
56 Correspondingly Positioned and Dimensioned Aperture for Reception of Locking Prong 54
60 Alternative Embodiment of Corner Seal Device
61, 63 Locking Attachment Prongs
62 Orange Peel-Type Self-Sealing Surface
64, 66 Respective Randomly Configured Bumps and Valleys in Orange Peel-Type Surface 62

70 Alternative Embodiment of Corner Seal Device
72, 74 Alternative Locking Attachment Prongs of Corner Seal Device 70 of FIG. 17

The invention claimed is:

1. A device for sealing a space defined between respective end portions of an adjacent pair of orthogonal flange members of a conditioned air duct having a generally rectangular cross-section, which comprises:
   a) a substantially planar first plate member having a surface dimensioned and configured for placement in face-to-face relation with the respective adjacent upper surface portions of said adjacent flange members; and
   b) a leg member extending away from a generally central portion of said plate member and being generally perpendicular thereto, said leg member comprising second and third orthogonal plate members extending in respective orthogonal planes and having respectively orthogonal surface portions, said second and third orthogonal plate members configured and dimensioned to engage corresponding respective adjacent orthogonal inner wall surface portions of said duct when said first plate member is positioned on said flange members.

2. The sealing device according to claim 1, wherein said leg member is integrally attached to said plate member.

3. The sealing device according to claim 2, wherein said first plate member and said leg member are monolithically formed of a material approved for heating, ventilating and air conditioning systems.

4. The sealing device according to claim 3, when said first plate member and said leg member are made of at least one of a metal and plastic.

5. The sealing device according to claim 4, wherein said metal is at least one of steel, galvanized steel, stainless steel and aluminum.

6. The sealing device according to claim 5, wherein said surface portions of said first plate member and said leg member which are adapted to contact said respective flange members and said corresponding respective inner wall surface portions of said duct are coated with adhesive sealing material for attachment to said respective surface portions so as to cover and seal said space between said flange members to prevent leakage of conditioned air therethrough.

7. The sealing device according to claim 6, wherein said adhesive sealing material is approved for heating, ventilating and air conditioning systems.

8. The sealing device according to claim 7, wherein said first plate member is configured to define a pair of orthogonal sections dimensioned for respective face-to-face engagement with said corresponding pair of orthogonal flange members, and said second and third plate members o said leg member are configured, dimensioned and positioned for face-to-face engagement with said corresponding orthogonal inner wall surface portions of said duct adjacent said corner.

9. The sealing device according to claim 8, wherein said first plate member is provided with at least one attachment device for attachment of said plate member in position with respect to said orthogonal flange members and said wall portions of said duct.

10. The sealing device according to claim 9, wherein an angle plate member is attached to said flange members at said corner, and said at least one attachment device of said first plate member is configured and dimensioned for locking attachment to said angle plate.

11. The sealing device according to claim 10, wherein said attachment device is comprised of a pair of locking attachment prongs extending perpendicular to said plate member, and configured to enter correspondingly dimensioned apertures in said angle plate, said locking attachment prongs being configured and dimensioned to become resiliently engaged with said apertures in said angle plate to retain said plate member and said leg member in position with respect to said ductwork.

12. The sealing device according to claim 11, wherein said at least one attachment device is comprised of upstanding side walls dimensioned, configured and adapted to resiliently engage the flange members of said duct to attach said plate member and said leg member to said duct.

13. The sealing device according to claim 12, wherein said rectangular shaped conditioned air duct has a square cross-section.

14. A sealing device for sealing flanged sections of ductwork attached together with the flanges positioned in face-to-face relation to form a continuous duct system for conducting conditioned air, said flanges being respectively oriented at right angles to each other and to the duct work, said flanges defining at least one aperture between their end portions, which may permit leakage of conditioned air therethrough, which comprises:
   a) a leg member having generally orthogonal plate members extending in respective orthogonal planes and adapted to be positioned in engagement with adjacent inner corner wall portions of the ductwork section, said leg member further having a substantially planar plate member integrally attached thereto and generally perpendicular thereto, said plate member being configured and dimensioned to be placed in face-to-face relation with respective adjacent surface portions of said flanges, said leg member and said plate member respectively provided with a soft sealing material on all surfaces coming into contact with the respective surface portions of the ductwork when inserted into the corner of the ductwork to prevent leakage of conditioned air.

15. A duct for directing conditioned air in a heating, ventilating and air conditioning type system, which comprises:
   a) a ductwork section having a generally rectangular cross section, each corner of said rectangular section having a pair of channel flanges extending orthogonally from the respective duct walls and orthogonally with respect to each other, the end portions of adjacent flanges defining an open space at each corner of the ductwork section;
   b) an angle plate seated at each said corner of said ductwork section in said channel flanges for attaching the section of ductwork to a second identical section of ductwork, each said angle plate including two legs formed together in angular relation by an integral corner; and
   c) a device for sealing said open space between said flanges, said device comprising:
      (i) a substantially planar first plate member having a surface portion dimensioned and configured for placement in face-to-face relation with the respective adjacent upper surface portions of said adjacent orthogonal flanges; and
      (ii) a leg member extending generally from, and generally perpendicular to a central portion of said plate member, said leg member being comprised of respective orthogonal second and third respective plate members extending in respective orthogonal planes and having respective surface portions configured and dimensioned to engage corresponding respective adjacent orthogonal inner wall surface portions of said ductwork section when said plate member is positioned on said flange members, thereby providing an airtight seal for at least a portion of said open space between said flange members.

16. The duct according to claim 15, wherein said ductwork section has a square cross-section.

17. A method of attaching two sections of flanged ductwork so as to provide an airtight duct for conducting conditioned air in a heating, ventilating and air conditioning system, said ductwork sections having a generally rectangular cross-section and said flanges of said ductwork being generally orthogonal to each other, comprising:
 a) positioning an angle plate into contact with one corner of a first ductwork section and progressively pressing said angle plate into said flanges, said angle plate including two legs formed together in angular relation, said flanges defining an open space between their respective ends, and further, having side edge marginal portions adjacent said each said leg of said angle plate;
 b) crimping said side edge portions of said flanges over each said leg of said angle plate to form a channel which positively locks said angle plate with respect to said adjacent flanges;
 c) positioning a device for sealing said open space between said flanges, said device comprising:
  i) a substantially planar plate member having a surface dimensioned and configured for placement in face-to-face relation with the respective adjacent upper surface portions of said adjacent flanges;
  ii) a leg member extending away from a generally central portion of said plate member and being generally perpendicular thereto, said leg member comprising second and third orthogonal plate members extending in respective orthogonal planes and having respectively orthogonal surface portions, said second and third orthogonal plate members configured and dimensioned to engage corresponding respective adjacent orthogonal inner wall surface portions of said duct when said plate member is positioned on said flanges;
  iii) at least one attachment device for attachment of said plate member in position with respect to said flanges: and
  iv) an adhesive sealing material on all surface portions of said plate member and said leg member which contact said flange member and said surface portions of said duct walls;
 d) repeating steps a), b) and c) on the remaining corners of said first ductwork section;
 e) repeating steps a), b), c) and d) on said second section of ductwork;
 f) positioning said first and second sections of ductwork in end-to-end relation by positioning said flange members in face-to-face relation;
 g) inserting at least one bolt-type fastener through respective aligned apertures of adjacent angle corners of said first and second ductwork sections, and securing said ductwork sections together with a nut-type fastener over each said bolt-type fastener at each corner of said ductwork sections.

18. The method according to claim 17, wherein said ductwork sections have a square cross-section.

19. A heating, ventilating and air conditioning system which includes ductwork for conducting conditioned air therethrough, said ductwork comprising:
 a) a ductwork section having a generally rectangular cross section, each corner of said rectangular section having a pair of channel flanges extending orthogonally from the respective duct walls, the end portions of adjacent flanges defining an open space at each corner of the ductwork section;
 b) an angle plate seated at each said corner of said ductwork section in said channel flanges for attaching the section of ductwork to a second identical section of ductwork, each said angle plate including two legs formed together in angular relation by an integral corner; and
 c) a device for sealing said open space between said flanges, said device comprising:
  i) a substantially planar first plate member having a surface portion dimensioned and configured for placement in face-to-face relation with the respective adjacent upper surface portions of said adjacent orthogonal flanges; and
  ii) a leg member extending from, and generally perpendicular to, a central portion of said plate member, said leg member comprising respective orthogonal second and third respective plate members extending in respective orthogonal planes and having surface portions, said second and third orthogonal plate members configured and dimensioned to engage corresponding respective adjacent orthogonal inner wall surface portions of said ductwork section when said plate member is positioned on said flange members, thereby providing an airtight seal for at least a portion of said open space between said flanges.

20. The heating, ventilating and air conditioning system according to claim 19, wherein said ductwork section has a square cross-section.

* * * * *